(12) United States Patent
Arcidiacono et al.

(10) Patent No.: US 11,072,127 B2
(45) Date of Patent: Jul. 27, 2021

(54) ULTRASONIC WELDING OF FIBRE REINFORCED THERMOSETTING RESIN SECTIONS

(71) Applicant: HEXCEL COMPOSITES LIMITED, Duxford (GB)

(72) Inventors: Marco Arcidiacono, Duxford (GB); John Ellis, Duxford (GB); Benjamin Chau, Cambridge (GB)

(73) Assignee: HEXCEL COMPOSITES LIMITED, Duxford (GB)

( * ) Notice: Subject to any disclaimer, the term of this patent is extended or adjusted under 35 U.S.C. 154(b) by 298 days.

(21) Appl. No.: 16/311,934

(22) PCT Filed: Jun. 7, 2017

(86) PCT No.: PCT/EP2017/063882
§ 371 (c)(1),
(2) Date: Dec. 20, 2018

(87) PCT Pub. No.: WO2017/220327
PCT Pub. Date: Dec. 28, 2017

(65) Prior Publication Data
US 2019/0210295 A1    Jul. 11, 2019

(30) Foreign Application Priority Data

Jun. 22, 2016 (GB) .................................. 1610873

(51) Int. Cl.
*B32B 7/00* (2019.01)
*B29C 65/08* (2006.01)
(Continued)

(52) U.S. Cl.
CPC .......... *B29C 65/08* (2013.01); *B29C 65/8215* (2013.01); *B29C 66/1122* (2013.01);
(Continued)

(58) Field of Classification Search
USPC ........................................................ 156/73.1
See application file for complete search history.

(56) References Cited

U.S. PATENT DOCUMENTS 4,907,513 A * 3/1990 Manion ................... F42B 14/02
                                                             102/527
7,794,555 B2 * 9/2010 LaFond ................... B29C 66/43
                                                             156/64

(Continued)

FOREIGN PATENT DOCUMENTS

DE        10313611 A1   10/2004
DE     102014209815 A1    9/2015
(Continued)

OTHER PUBLICATIONS

International Search Report (ISR) issued in the related International Application No. PCT/EP2017/063882, dated Sep. 21, 2017.
(Continued)

Primary Examiner — James D Sells
(74) Attorney, Agent, or Firm — W. Mark Bielawski

(57) ABSTRACT

Process for forming a permanent join between two sections of fibrous material contained in a thermosetting resin matrix, said process comprising overlaying the two sections and subjecting the overlaid sections to ultrasonic welding to form a permanent join between the two sections, wherein there is no significant change in the sub-ambient Tg of the fibrous material contained in the thermosetting resin matrix in the region of the permanent join.

8 Claims, 4 Drawing Sheets

(51) Int. Cl.
*B29C 65/82* (2006.01)
*B29C 65/00* (2006.01)
*B29C 70/54* (2006.01)

(52) U.S. Cl.
CPC ....... *B29C 66/223* (2013.01); *B29C 66/225* (2013.01); *B29C 66/244* (2013.01); *B29C 66/43* (2013.01); *B29C 66/71* (2013.01); *B29C 66/721* (2013.01); *B29C 66/72141* (2013.01); *B29C 66/73117* (2013.01); *B29C 66/73752* (2013.01); *B29C 66/73941* (2013.01); *B29C 66/81411* (2013.01); *B29C 66/853* (2013.01); *B29C 66/929* (2013.01); *B29C 66/949* (2013.01); *B29C 66/9513* (2013.01); *B29C 66/9517* (2013.01); *B29C 70/543* (2013.01); *B29C 66/7212* (2013.01)

(56) References Cited

U.S. PATENT DOCUMENTS

| | | |
|---|---|---|
| 2002/0112804 A1 | 8/2002 | Woods et al. |
| 2008/0314498 A1* | 12/2008 | Lee ............... B29C 66/73754 156/64 |
| 2015/0151486 A1 | 6/2015 | Dahl et al. |
| 2015/0246480 A1 | 9/2015 | Sano |
| 2017/0015055 A1* | 1/2017 | Hufenbach ............ B29C 70/46 |

FOREIGN PATENT DOCUMENTS

| | | |
|---|---|---|
| EP | 1337400 B1 | 6/2012 |
| JP | 2007313778 A | 12/2007 |
| WO | 2006042251 A2 | 4/2006 |

OTHER PUBLICATIONS

Search Report (SR) issued in the related Application No. GB1610873.0, dated Dec. 14, 2016.
Search Report (SR) issued in the related Application No. GB1709100.0, dated Dec. 7, 2017.

* cited by examiner

ULTRASONIC WELDING OF FIBRE REINFORCED THERMOSETTING RESIN SECTIONS

The present invention relates to processes for the formation of permanent joins between sections of fibrous reinforced thermosetting resins by ultrasonic welding in which there is no significant change to the chemistry of the resin in the regions of the joins, and particularly processes in which the thickness of the joined sections is substantially the same as the thickness of the unjoined sections.

BACKGROUND

The invention is particularly useful in the production of long lengths of prepreg slit tapes that are used in automatic fibre placement (AFP) machines. These tapes are typically 3.2 mm, 6.35 mm, 12.7 mm and 25.4 mm wide after slitting. The master roll of prepreg tape being slit to these narrow widths can be typically 75 mm, 150 mm, 300 mm or 600 mm wide. Long lengths of such master roll prepreg tapes are required in order to produce the long lengths of slit tape prepregs for use in automatic fibre placement (AFP) and often lengths are required that are longer than can be conveniently provided by a supplier. It is therefore often necessary to join together two or more master prepreg tape reels in order to provide a sufficient length of narrow slit tape for use in automatic fibre placement. The master width prepreg tapes or sections are usually joined at the slitting step by overlapping the ends of the tapes and applying pressure and temperature to the overlapping pieces to join them together. However this suffers from the disadvantage that the thickness of the continuous tape is significantly greater at the position of the joint, often from from 80% to 100% thicker than non-joined areas, which can result in blemishes and thickness increases where two or more joints coincide in the thickness of a part or finished article produced from the continuous slit narrow tape in AFP processes or other tape layup processes. The present invention is also useful in the joining together of other materials comprising fibrous material contained in a thermosetting resin matrix, such as semipregs and towpregs.

Other methods for joining materials are known, including the use of adhesives, etc. however many of these methods have the potential to alter the chemistry of a thermosetting resin in the joined region, for example by advancing the cure state of the resin, resulting in differences in final properties after curing between the joined and non-joined regions, and are therefore unsuited for use with fibrous materials contained in a thermosetting resin.

Ultrasonic welding is an industrial technique whereby high-frequency ultrasonic acoustic vibrations are locally applied to workpieces to create a solid-state weld. This is not to be confused with ultrasound and ultrasonic waves that can have a wide range of frequencies that for example encompass 20 kHz to 1 GHz. Ultrasonic welding comprises physical contact of a sonotrode to a material to be processed. Ultrasonic welding as referred to is applying ultrasonics at typically frequencies of between 15 and 70 kHz, typically 20, 30 and 35 kHz to an area to be joined. Within the ultrasonic welding process an electrical input is provided to a convertor. The convertor contains piezoelectric material (PZT) sandwiched between two metal discs. The electrical input stimulates the PZT material to vibrate changing this electrical energy into kinetic energy such that the motion of the PZT is transferred into vertical motion in a booster or, if no booster employed, directly into a sonotrode (also known as a horn).

This vertical motion is tailored by the design of the welding system and its control parameters such that a certain amplitude of the vertical motion is achieved at the interface of the sonotrode and the materials being processed. Typically, the material to be welded will be placed between the sonotrode and an anvil. The anvil can be a plate, a roller or a profiled drum or any other supportive surface, in order to allow the pressure from the ultrasonic tool to be effectively applied to the material being processed.

It has been proposed to use ultrasonics and ultrasonic welding in the lamination of carbon preforms such as fabrics woven from carbon fibres. An article in Kunstoffe International 10/2012 page 188-189 and which is translated in the publication Joining Technology discusses the use of ultrasonics to activate an adhesive positioned between carbon preforms. It has also been proposed in Chinese Patent publication 103802230, Russian Patent 2321606 and JP 10036531 that ultrasound may be used to aid the impregnation of fibrous materials with resinous materials.

SUMMARY OF THE INVENTION

The present invention aims to obviate or at least mitigate the above described problems and/or to provide advantages generally.

According to the present invention, there is provided a process and materials as defined in any of the accompanying claims.

In a first aspect, the present invention provides a process for forming a permanent join between two sections of fibrous material contained in a thermosetting resin matrix, said process comprising overlaying the two sections and subjecting the overlaid sections to ultrasonic welding to form a permanent join between the two sections, wherein there is no significant change in the sub-ambient Tg of the fibrous material contained in the thermosetting resin matrix in the region of the permanent join.

In a second aspect, the present invention provides sections of fibrous material contained in a thermosetting resin matrix permanently joined together by a process according to the present invention.

SPECIFIC DESCRIPTION

In the processes of the present invention the join formed between two overlaid sections of fibrous material contained in a thermosetting resin matrix is the result of the temperature generated by the vertical motion of the sonotrode on the material surfaces, which causes the thermosetting resin viscosity to reduce sufficiently that the fibrous material in the two overlaid sections can merge as a consequence of the applied pressure during the ultrasonic welding. Once the active stage of the welding ceases the viscosity of the thermosetting resin matrix increases back to its original value, providing a permanent join between the overlaid sections.

In the context of the present invention a permanent join means a join which will not separate under conditions to which the material is subjected during normal use, for example during use in tape layup processes such as automatic tape layup or automatic fibre placement processes. In particular, a permanent join means a join that will not separate under tensile pulling forces of 13N for 2 minutes at 14° C., although in some cases the processes of the present invention can produce much stronger joins. In preferred embodiments of the present invention the permanent join formed in the process will not separate under tensile pulling forces of 40N for 2 minutes at 14° C. Additionally or alternatively, the strength of the permanent joins formed by the process of the present invention is such that the sections of joined materials may be rolled up on, or passed around, a wrap angle of 30 to 80 mm at reduced temperatures, such as 14° C., under a load of at least 13N and potentially much higher loads.

In addition, we have found that the use of ultrasonic welding to join two sections of fibrous material contained in a thermosetting resin matrix allows a permanent join to be formed without significantly affecting the chemistry of the fibrous material contained in the thermosetting resin matrix. In particular, in the processes of the present invention no significant change is produced in the sub-ambient Tg of the fibrous material contained in the thermosetting resin matrix in the region of the permanent join. Preferably, the sub-ambient Tg of the fibrous material contained in the thermosetting resin matrix in the region of the permanent join differs by no more than plus or minus 10° C. from the sub-ambient Tg of the fibrous material contained in the thermosetting resin matrix before the ultrasonic welding, and therefore also from the sub-ambient Tg of the fibrous material contained in the thermosetting resin matrix in the regions not subjected to ultrasonic welding, more preferably by no more than plus or minus 6° C. and most preferably by no more than plus or minus 3° C. This is beneficial in that the resin in the joined area is substantially the same as elsewhere, which results in a product of more uniform properties following laying up, moulding and curing of the joined material.

Sub-ambient Tg may be measured by any suitable method, such as by DSC (differential scanning calorimetry).

In a preferred embodiment of the present invention, the thickness of the permanent join is from 50% to 150% of the average thickness of each of the two overlaid sections before they are overlaid. Thus, in this embodiment, when two sections of material having approximately the same thickness are joined, the thickness of the join is from 50% to 150% of the thickness of the material before it is joined, i.e. the thickness of the joined section is from 50% to 150% of the surrounding unjoined sections. More preferably, the thickness of the permanent join is from 60% to 140% of the average thickness of each of the two overlaid sections before they are overlaid, even more preferably from 75% to 125% or from 80% to 120%, and most preferably from 90% to 110%.

The length of the overlaid section subjected to ultrasonic welding in the process of the present invention will affect the strength of the join following ultrasonic welding; in particular, increasing the length of the overlaid welded section will generally increase the strength of the join up to a certain value. However, very large lengths of overlaid material will be wasteful, and may also require the provision of special equipment to weld the entire length.

Thus, in preferred embodiments of the present invention, the length of the overlaid section is from 3 mm to 200 mm, more preferably from 10 mm to 150 mm, and most preferably from 15 mm to 75 mm.

In preferred embodiments of the present invention at least the entire length of the overlaid section is subjected to ultrasonic welding, and more preferably the entire length of the overlaid section plus from 5 to 50 mm, most preferably from 10 to 25 mm, of the fibrous material contained in a thermosetting resin immediately adjacent to each end of the overlaid section is subjected to ultrasonic welding.

The processes of the present invention are particularly suitable for joining two sections of fibrous material contained in a thermosetting resin matrix wherein both sections are of substantially the same width, and may generally be used to join materials of any width. However, generally the width of each of the two sections to be joined may be from 3 mm to 5 m, such as from 3 mm to 3 m, for example 3.2 mm, 6.35 mm, 12.7 mm, 25.4 mm, 75 mm, 150 mm, 300 mm and 600 mm.

Any equipment suitable for carrying out ultrasonic welding may generally be used in the processes of the present invention; however, in preferred embodiments of the present invention the ultrasonic welding is carried out by contacting the area to be ultrasonically welded with a sonotrode while it is supported by an anvil. In this context, an anvil means any surface suitable for supporting overlaid sections of fibrous material contained in a thermosetting resin matrix while they are contacted by a sonotrode. The anvil should therefore be suitably resilient to allow the energy from the sonotrode to be transferred to the supported materials. In particular, the anvil may be in the form of a generally flat plate, a drum or a roller, and optionally the surface of the anvil may be embossed.

In conventional ultrasonic welding apparatus, an ultrasonic generator electronically converts line voltage into a high voltage/high frequency signal and delivers it to a converter. In the converter, piezoelectric crystals are sandwiched between two titanium discs and vibrate (expand and contract) at the frequency of the applied electrical signal. The vibration produces a very fast mechanical movement of 20,000 cycles per second with small amplitude of about 18 microns (peak-to-peak). Optionally, the amplitude of the vibration can be increased by connecting an amplitude coupler (booster) to the converter. A typical gain of an amplitude coupler is 1:2. A Sonotrode (ultrasonic horn), which is connected to the lower end of the amplitude coupler, further increases the amplitude, typically by a factor of 2 to 3. During the ultrasonic welding process the materials to be joined are compressed between the contact surface of the sonotrode and the top of the anvil. Generally, a sonotrode may be formed from titanium, aluminium or steel, with or without heat treatment.

Commercially available sonotrodes may have a generally rectangular contact surface with a length of from 5 mm to 50 mm, such as from 25 mm to 35 mm, in a first direction, and a length of from 100 mm to 500 mm, such as 200 to 350 mm, in a second direction. In a particular embodiment of the processes of the present invention, the shape of the sonotrode contact surface and the length of the overlaid section are selected so that, in use, the contact surface of the sonotrode covers the entire area to be ultrasonically welded. This embodiment is particularly suitable for joining materials having widths of 50 mm or less.

In an alternative embodiment of the present invention, the sonotrode has a contact surface smaller than the entire area to be ultrasonically welded in at least one direction, so that only a part of the area of overlap is subjected to ultrasonic welding in a single step. In this embodiment the process therefore preferably comprises sequentially subjecting sections of the area to be ultrasonically welded to ultrasonic welding until substantially the entire area to be ultrasonically welded is permanently joined. This embodiment is particularly suitable for joining materials having widths of greater than 30 mm and/or overlap lengths of greater than 30 mm. Generally the sonotrode and material to be joined are held in a fixed position with respect to each other during the welding step, so that, in this embodiment the sequential welding steps may be carried out by any suitable means, such as moving the material to be joined laterally in a first and/or second direction under the sonotrode between welding steps, and/or by moving the sonotrode laterally in a first and/or second direction over the material to be joined between welding steps. Alternatively, the sonotrode may be continuously moved laterally in a first and/or second direction over the surface of the material to be joined during the welding step, for example by using a sonotrode with a rotating contact surface.

The frequency, the amplitude of the ultrasonic motion, the force applied during the ultrasonic welding process, and the time that these are applied for; as well as the holding time after treatment are five key process parameters that cause the sections to permanently join together, and they also determine the strength of the joint that is formed. A further factor that may be relevant is the distance between the sonotrode and the anvil at the sonotrode's lowest point. These factors may all also affect the thickness of the permanent join.

The physical and chemical composition of the sections of fibrous material contained in a thermosetting resin matrix to be joined will also affect the strength of the join formed as well as the thickness of the join. However, one skilled in the art will appreciate that for any given material suitable process parameters may be identified by relatively straightforward tests. For example, the optimum frequency may be determined from trial work based on a specific fibrous material contained in a particular thermosetting resin matrix, and the preferred amplitude of the vibration can be determined by trial and error by using amplitude couplers with different gains and electronic adjustment at the ultrasonic generator. Once the optimum frequency and amplitude have been determined for an application or material combination, the frequency and amplitude can be set as a constant, and the weld force that the sonotrode applies to the material and the time this pressure is applied for whilst the ultrasonic welding is in progress and then the holding time without ultrasonic motion of the sonotrode after the ultrasonic welding is done in order to achieve a particular degree of join strength and/or join thickness can be determined.

In general, light welding forces and short welding times for ultrasonic welding process followed by short holding times result in lower joint strengths. With increasing weld forces, welding treatment times and holding times after the welding ultrasonic motion of the sonotrode the joint strength increases to a maximum and then reduces over certain values for these variables. The required amount of force depends on the desired joint strength, the desired joint thickness increase and the material or material combination to be ultrasonically welded, the welding time or the speed of movement of the sections and the area of the joint.

Once the parameters have been established in order to achieve a consistent permanent joint quality, the five weld parameters frequency, amplitude, treatment time, and force and the holding time after treatment can be kept constant. The effect of introducing a gap between the lowest point of the sonotrode and the anvil can also be investigated during this process. Of course, one skilled in the art will appreciate that the above parameters can be tested in any order or combination.

In a particular embodiment of the present invention, the sonotrode operates at a frequency of from 15 to 70 kHz, preferably from 16 to 35 kHz, more preferably from 20 to 35 kHz.

In a particular embodiment of the present invention, the sonotrode operates with an amplitude of from 5 to 150 µm, preferably from 50 to 100 µm.

In a particular embodiment of the present invention, the sonotrode operates with a pressure of from 0.01 to 0.6 MPa (0.1 to 6 bar), preferably from 0.05 to 0.3 MPa (0.5 to 3.0 bar).

In a particular embodiment of the present invention, the sonotrode operates for a welding period of from 0.01 to 30 seconds, preferably from 0.05 to 20 seconds, more preferably from 0.1 to 5 seconds.

In a particular embodiment of the present invention, the sonotrode is operated with a hold time of from 0.1 to 10 seconds following completion of the weld time, preferably from 2 to 8 seconds. During the hold time, sonotrode is held at its closest point to the anvil without ultrasonic motion and therefore applies static pressure to the welded section.

In a particular embodiment of the present invention, the sonotrode and anvil are arranged so that when the sonotrode is at its closest point to the anvil, the gap between the sonotrode and the anvil is from zero to 150% of the average thickness of each of the two overlaid sections before they are overlaid, i.e. when the two overlaid materials have substantially the same thickness, the gap is from zero to 150% of the thickness of a single layer of material. Preferably the gap is from zero to 100% of the average thickness of each of the two overlaid sections before they are overlaid, i.e. when the two overlaid materials have substantially the same thickness, the gap is from zero to 100% of the thickness of a single layer of material.

In the processes of the present invention in which the ultrasonic welding is carried out by bringing a component, such as a sonotrode contact surface and/or an anvil, into contact with the overlaid sections of fibrous material contained in a thermosetting resin matrix, it is advantageous to prevent the component contacting the overlaid sections of fibrous material contained in a thermosetting resin matrix from becoming stuck thereto and/or to prevent the thermosetting resin matrix becoming attached to the component. This may be achieved, for example, by positioning a layer of material having at least one non-stick surface between the contact surface of the sonotrode and/or the anvil and the overlaid sections of fibrous material contained in a thermosetting resin matrix. Suitable materials include any materials having non-stick properties on at least one surface, and preferably also being non-compressible. Particularly suitable materials include PTFE coated materials, such as PTFE coated glass cloth, and silicone coated materials, such as silicone coated calendared and non-calendared papers (the use of calendared or non-calendared materials being determined based on the grade of prepreg being joined). Examples of PTFE coated materials include PTFE coated glass cloth (such as standard grade 7058 Tygadur, available from Taconic Wildcat, UK (e.g. Part Number 7058, overall thickness 0.0045 inches, coated weight 0.44 ibs/sq yd, tensile strength warp/fill 160/150 ibs/inch, tear strength warp/fill 5.0/5.0 ibf, dielectric strength 1000 volts/mil). A suitable calendared paper is Mondi 120 g GL silicone release coated paper, and a suitable non-calendared paper is Laufenberg NSS900 silicone coated paper.

Such non-stick surface materials may be applied to one or both surfaces of entire lengths of the fibrous materials contained in a thermosetting resin matrix during their manufacture, but before they are joined by the processes of the present invention, and removed after the joining process has been completed.

The fibrous material contained in a thermosetting resin matrix joined by the processes of the present invention may be in any form, but in preferred embodiments the sections of fibrous material contained in a thermosetting resin matrix may be fibre tows containing resins (sometimes known as towpregs) or layers of fibres contained within the resin (sometimes known as prepregs or semipregs). In a further embodiment the sections of fibrous material contained within a matrix of a curable resin comprise the ends of tapes of layers of fibres contained within resin, such as the ends of reels of prepreg tapes.

In embodiments of the present invention in which the two sections of fibrous material contained in a thermosetting resin matrix comprise the ends of tapes of layers of fibres contained within resin, the joined tapes may subsequently be fed to a tape layup process, preferably an automatic tape layup process or an automatic fibre placement process. Where the materials joined by the processes of the present invention are relatively wide, they may be cut or slit into narrower tapes before being fed to such tape layup processes.

The fibrous material contained in a thermosetting resin matrix that can be joined according to the present invention may contain a wide-range of thermosetting resin matrix compositions, including epoxy resins, polyester resins and bismaleimide resins. In a preferred embodiment, the thermosetting resin matrix comprises an epoxy resin.

The epoxy resin material component or epoxy resin polymer or in short, epoxy resin may be selected from any of the commercially available diglycidylethers of Bisphenol-A either alone or in combination, typical materials in this class include GY-6010 (Huntsman Advanced Materials, Duxford, UK), Epon 828 (Resolution Performance Products, Pernis, Netherlands), and DER 331 (Dow Chemical, Midland, Mich.).

The Bisphenol-A epoxy resin component preferably constitutes from 30 to 50% w/w of the total resin matrix and the remainder may be a different thermosetting resin component material and/or a thermoplastic material and/or any other known resin matrix components, such as hardening agents, for example rubber materials.

Preferred epoxy resins have an Epoxy Equivalent Weight (EEW) in the range from 150 to 1500, preferably a high reactivity such as an EEW in the range of from 200 to 500. Suitable epoxy resins may comprise blends of two or more epoxy resins selected from monofunctional, difunctional, trifunctional and/or tetrafunctional epoxy resins.

Suitable difunctional epoxy resins, by way of example, include those based on: diglycidyl ether of bisphenol F, diglycidyl ether of bisphenol A (optionally brominated), phenol and cresol epoxy novolacs, glycidyl ethers of phenol-aldelyde adducts, glycidyl ethers of aliphatic diols, diglycidyl ether, diethylene glycol diglycidyl ether, aromatic epoxy resins, aliphatic polyglycidyl ethers, epoxidised olefins, brominated resins, aromatic glycidyl amines, heterocyclic glycidyl imidines and amides, glycidyl ethers, fluorinated epoxy resins, glycidyl esters or any combination thereof.

Difunctional epoxy resins may be selected from diglycidyl ether of bisphenol F, diglycidyl ether of bisphenol A, diglycidyl dihydroxy naphthalene, or any combination thereof.

Suitable trifunctional epoxy resins, by way of example, may include those based upon phenol and cresol epoxy novolacs, glycidyl ethers of phenol-aldehyde adducts, aromatic epoxy resins, aliphatic triglycidyl ethers, dialiphatic triglycidyl ethers, aliphatic polyglycidyl amines, heterocyclic glycidyl imidines and amides, glycidyl ethers, fluorinated epoxy resins, or any combination thereof. Suitable trifunctional epoxy resins are available from Huntsman Advanced Materials (Monthey, Switzerland) under the tradenames MY0500 and MY0510 (triglycidyl para-aminophenol) and MY0600 and MY0610 (triglycidyl meta-aminophenol). Triglycidyl meta-aminophenol is also available from Sumitomo Chemical Co. (Osaka, Japan) under the tradename ELM-120.

Suitable tetrafunctional epoxy resins include N,N,N',N'-tetraglycidyl-m-xylenediamine (available commercially from Mitsubishi Gas Chemical Company under the name Tetrad-X, and as Erisys GA-240 from CVC Chemicals), and N,N,N',N'-tetraglycidylmethylenedianiline (e.g. MY0720 and MY0721 from Huntsman Advanced Materials). Other suitable multifunctional epoxy resins include DEN438 (from Dow Chemicals, Midland, Mich.) DEN439 (from Dow Chemicals), Araldite ECN 1273 (from Huntsman Advanced Materials), and Araldite ECN 1299 (from Huntsman Advanced Materials).

In a particular embodiment of the present invention, the thermosetting resin matrix of the fibrous material contained in a thermosetting resin matrix that can be joined according to the present invention may comprise a curative. Any suitable curative may be present, such as known accelerators and/or curing agents. Particularly suitable curatives for use with epoxy resins are urea based curing agents and it is preferred to use from 0.5 to 10 wt % based on the weight of the epoxy resin of a curing agent, more preferably 1 to 8 wt %, more preferably 2 to 8 wt %. Preferred urea based materials are the range of materials available under the commercial name Urone®. In addition to a curing agent, a suitable accelerator such as a latent amine-based curing agent, such as dicyanopolyamide (DICY) may also be present.

In an alternative embodiment of the present invention, the thermosetting resin matrix of the fibrous material contained in a thermosetting resin matrix that can be joined according to the present invention is substantially free of curative. In this embodiment, a curative may optionally be added to the thermosetting resin matrix after the ultrasonic welding step, for example after or during the lay up of the fibrous material contained in a thermosetting resin matrix.

The fibrous material contained in a thermosetting resin matrix that can be joined according to the present invention may contain a wide-range of fibres, for example glass, carbon, graphite, boron, ceramic, aramid, polyamide or polyester fibres, or natural fibres. Preferred fibres are carbon and glass fibres. Hybrid or mixed fibre systems may also be envisaged. The use of cracked (i.e. stretch-broken) or selectively discontinuous fibres may be advantageous to facilitate lay-up of the product produced according to the invention and improve its capability of being shaped. Although a unidirectional fibre alignment is preferable, other forms may also be used. Typical textile forms include simple textile fabrics, knit fabrics, twill fabrics and satin weaves. It is also possible to envisage using non-woven or non-crimped fibre layers.

The sections of fibrous material contained in a thermosetting resin matrix that may be joined in the processes of the present invention will generally have straight/flat ends when manufactured, and in certain embodiments of the present invention they may be joined without any changes being made to the ends. However, in some cases the thickness of the regions after joining may be reduced by shaping one or both of the ends to be joined to remove a portion of the material before joining, and this is particularly useful when joining relatively wide materials. Thus, carrying out the processes of the present invention without shaping either of the ends of the materials to be joined is particularly suitable for joining materials having widths of from 3 mm to 3 m, such as from 3 mm to 35 mm.

In a particular embodiment of the present invention, at least one of the sections of fibrous material contained in a thermosetting resin matrix is shaped to remove a portion of the material in the area to be joined before the sections are overlaid. This is particularly suitable for joining materials having widths of from 25 mm to 5 m, more particularly widths of from 50 mm to 3 m. In this embodiment, preferably both sections of fibrous material contained in a thermosetting resin matrix are shaped to remove a portion of the material in the area to be joined before the sections are overlaid, and particularly preferably both sections are shaped so that the ends fit together or mesh, to increase the bonding area and further increase the strength and homogeneity of the join. In particular, at least one of the sections to be joined may be shaped in a castellated or saw-tooth pattern, preferably wherein both sections to be joined are shaped in complimentary castellated or saw-tooth patterns, and most preferably wherein both sections are shaped in complimentary saw-tooth patterns.

In a preferred embodiment, both sections of fibrous material contained in a thermosetting resin matrix are shaped, and the amount of material removed from each shaped section is from 25 to 75%. More preferably the same amount of material is removed from each section, and most preferably approximately 50% of the material is removed from each end.

In a preferred embodiment, both sections of fibrous material contained in a thermosetting resin matrix are shaped in a saw tooth pattern, and the width of the base of each saw tooth is from 1 to 10 mm, preferably from 3 to 7 mm.

In a preferred embodiment, both sections of fibrous material contained in a thermosetting resin matrix are shaped in a saw tooth pattern, and the height of each saw tooth is from 10 to 150 mm, preferably from 15 to 100 mm, more preferably from 15 to 75 mm.

Examples of suitable saw-tooth patterns include a base width of 6 mm and a height of 20 mm, and a base width of 5 mm and a height of 50 mm.

When both sections of fibrous material contained in a thermosetting resin matrix are shaped in a complimentary saw-tooth pattern they may be joined in various possible arrangements.

For example, the two sections may be positioned so that the tips of the saw-teeth on one section are in line with the tips of the saw-teeth on the other section. Alternatively the two sections may be positioned so that the tips of the saw-teeth on one section are in line with the lowest points between the saw-teeth on the other section, or any arrangements between these 2 extremes is possible. In general the alignment of the saw-teeth will not be particularly important, particularly if the saw-teeth have relatively narrow bases. However, in some case, it may be preferable to arrange the ends so that the saw-teeth on one section align with the lowest points between the saw-teeth of the other section.

In general it is preferred that where the ends of the sections have a saw-tooth pattern, the end are overlapped for joining by at least 50% of the height of the saw-teeth, more preferably from 100% to 150% of the height of the saw-teeth.

In preferred embodiments of the present invention the area of the join between two sections of fibrous material contained in a thermosetting resin matrix joined by the process of the invention is effectively indistinguishable from the other, i.e. non-joined, sections of material, with respect to physical and/or chemical properties; however, in some cases the properties of the joined area may be improved in at least some respects compared to the non-joined areas.

EXAMPLES

The invention will now be illustrated by reference to the following Examples and Figures, in which.

Figure 1:
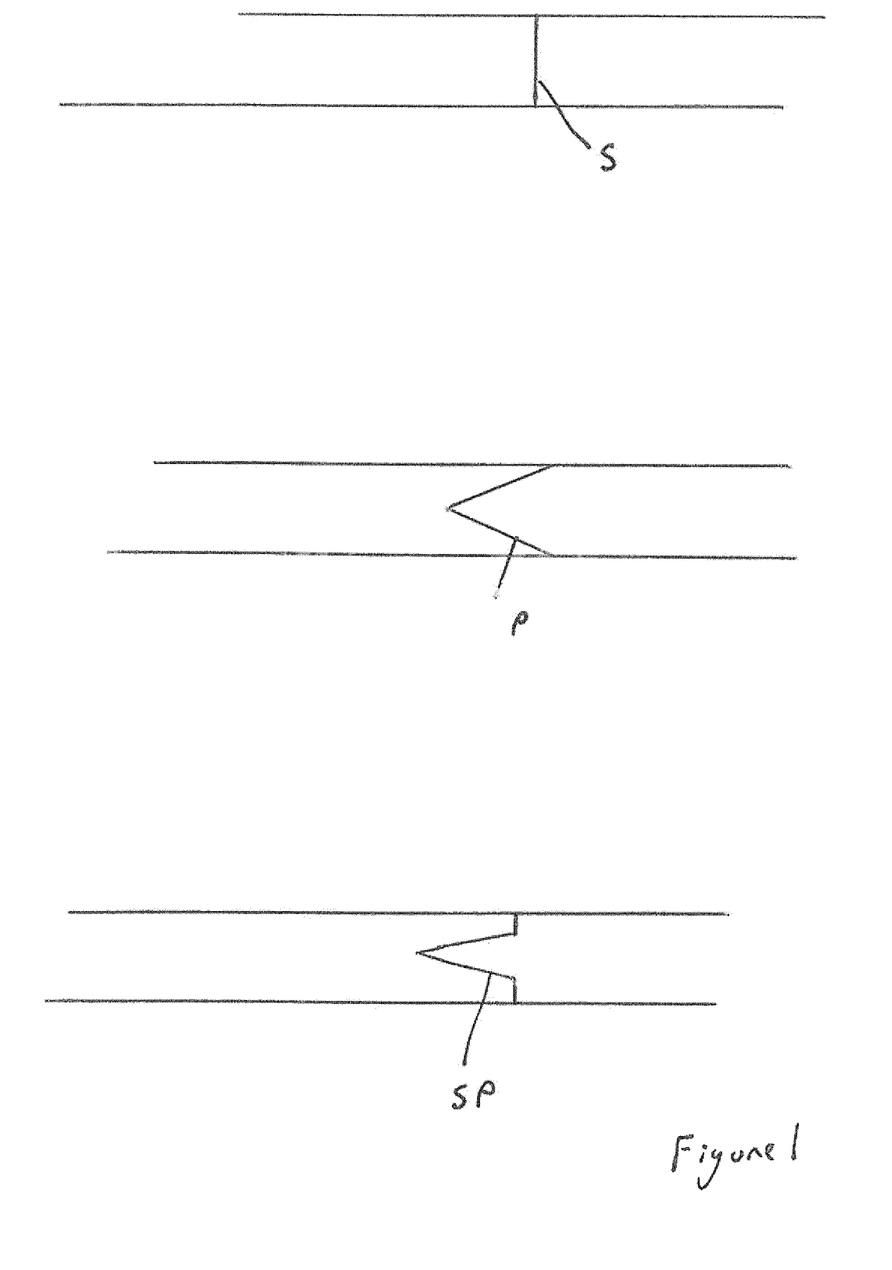
FIG. 1 illustrates the structure of 3 exemplary shaped joins according to the present invention.

The materials shown in FIG. 1 represent two narrow sections of composite material joined using three different shaped joints. In the first join (S), the two sections of composite material have flat (unshaped) ends and are overlaid to provide a region for joining having a uniform thickness. In the second join (P), the two sections of composite material each have ends that have been shaped into a triangle (saw-tooth), and have been overlaid so that the bases of each of the triangles meet, i.e. so that the triangular end of each section overlies a flat region of the other section. In the third join (SP), the two sections of composite material each have ends that have been shaped to produce two peripheral straight sections and a central triangle (saw-tooth), and have been overlaid so that the straight sections of each section meet and the triangular ends of each section overlie flat regions of the other section.

Figure 2:
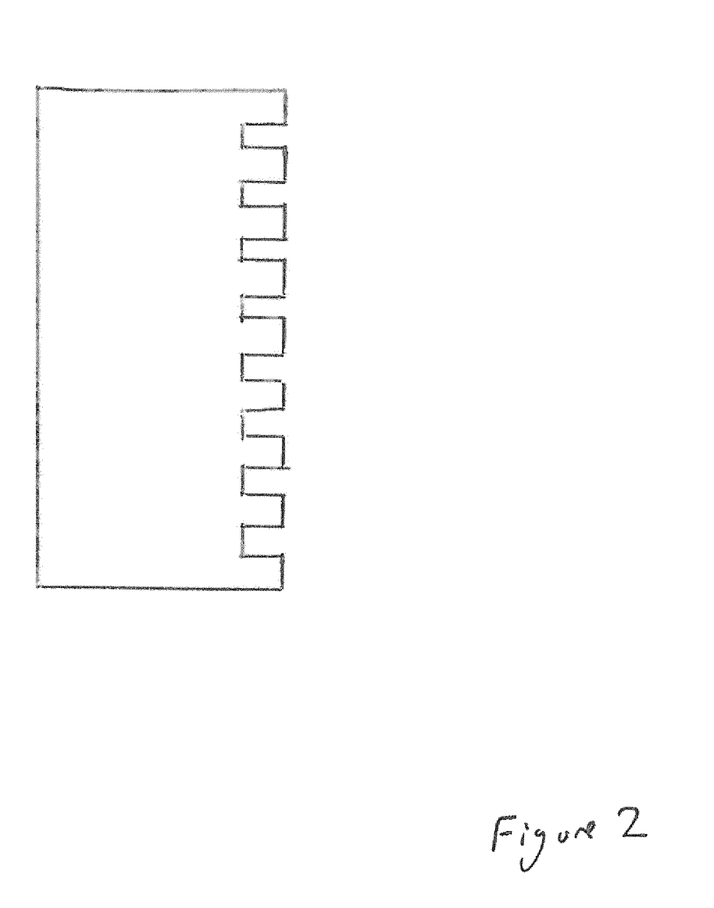
FIG. 2 illustrates a castellated shaped section of material to be joined according to a process of the present invention.

The material shown in FIG. 2 represents a section of composite material having a width of 52 mm. One end of the material has been shaped to form a castellated arrangement having 10 mm long and 4 mm wide projecting sections separated by 2 mm wide recessed sections.

Figure 3:
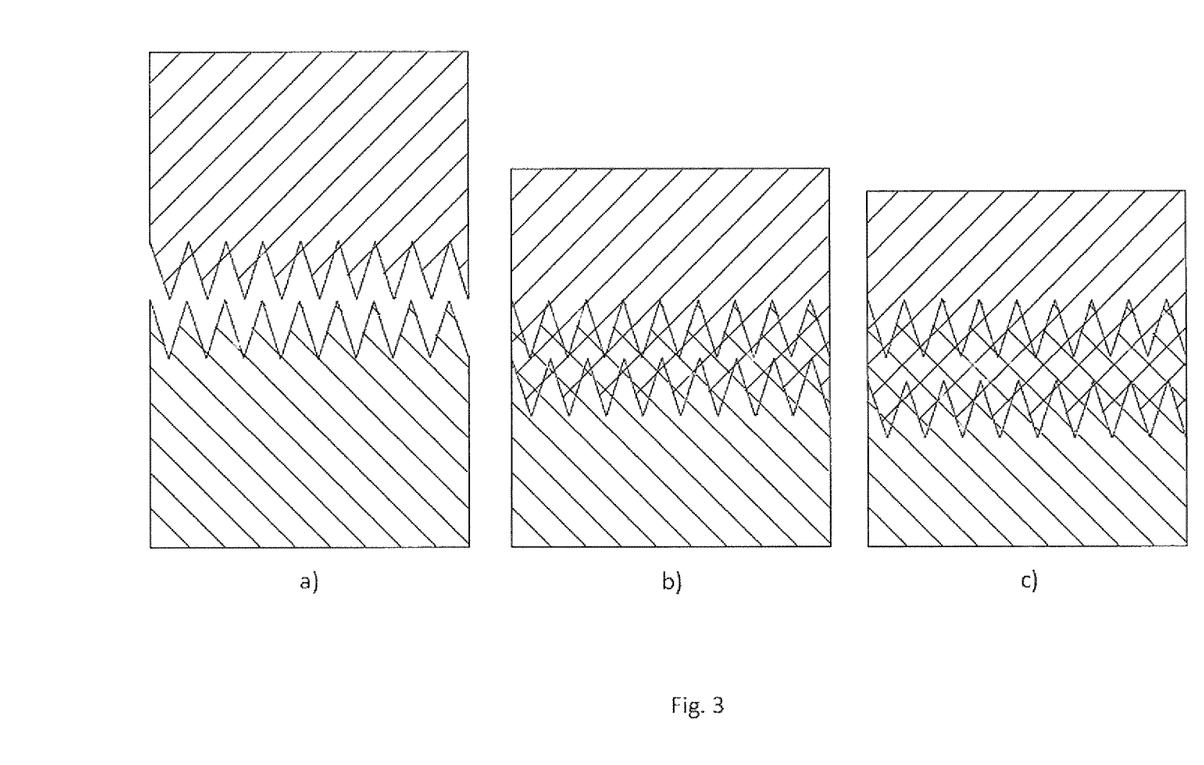
FIG. 3 illustrates two pieces of saw-tooth shaped sections of material suitable for joining according to a process of the present invention in 3 arrangements.

The materials shown in FIG. 3 represent 2 sections of composite material each having ends shaped in a saw-tooth pattern comprising triangles having a base width of 6 mm and a height of 20 mm. In a) the two sections of material are arranged with the peaks of the first section of material facing the troughs of the second section of material (PtoV) but with no overlap of the materials. In b) the first section of material has been advanced towards the second section by 40 mm, so that the there is a combined 40 mm region of overlap of the two sections of material including two regions having the thickness of one of the sections and a central region having the thickness of both sections. In c) the first section has been advanced towards the second section by 50 mm, creating a 50 mm region of overlap again including two regions having the thickness of one of the sections and a larger central region having the thickness of both sections. As will be appreciated, it is also possible to produce a smaller area of overlap, for example by advancing the first section by only 30 mm towards the second section, and this will result in a 30 mm region of overlap again comprising two sections having the thickness of one of the sections but comprising a smaller central region having the thickness of both sections.

Figure 4:
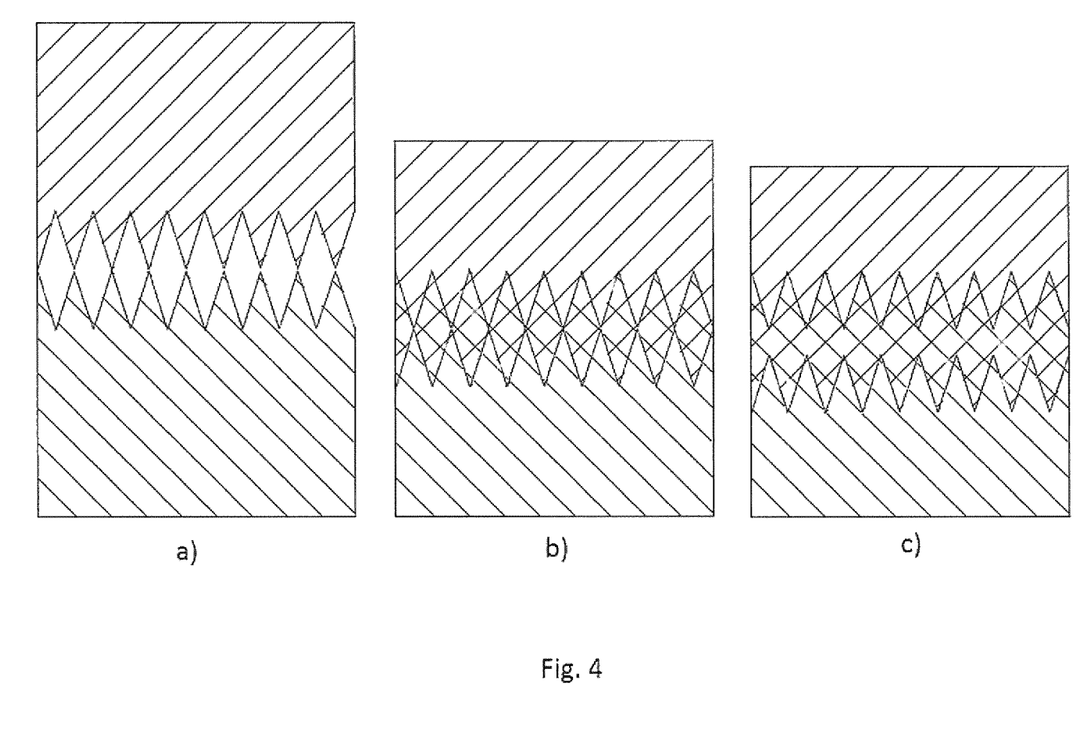
FIG. 4 illustrates two pieces of saw-toothed sections of material suitable for joining according to a process of the present invention in 3 further arrangements.

The materials shown in FIG. 4 represent 2 sections of composite material each having ends shaped in a saw-tooth pattern comprising triangles having a base width of 6 mm and a height of 20 mm. In a) the two sections of material are arranged with the peaks of the first section of material facing the peaks of the second section of material (PtoP) but with no overlap of the materials. In b) the first section of material has been advanced towards the second section by 40 mm, so that the there is a combined 40 mm region of overlap of the two sections of material including two regions having the thickness of one of the sections and a number of central regions having the thickness of both sections. In c) the first section has been advanced towards the second section by 50 mm, creating a 50 mm region of overlap again including two regions having the thickness of one of the sections but now having a single large central region having the thickness of both sections. As will be appreciated, it is also possible to produce a smaller area of overlap, for example by advancing the first section by only 30 mm towards the second section, and this will result in a 30 mm region of overlap again comprising two sections having the thickness of one of the sections and a number of central regions having the thickness of both sections, but also including regions having no material and therefore no thickness Example 1

Ultrasonic welding was carried out to join sections of prepreg formed from unidirectional carbon fibres impregnated with curable epoxy resin. The prepreg comprised Intermediate Modulus type A carbon fibre 12 k, impregnated with epoxy resin M21EV, the resin content was 34% by weight and the fibre areal weight was 268 gm$^{-2}$. The individual components and the prepreg are available from Hexcel Composites Limited. Tapes were prepared with 3 widths: 6.5 mm, 12.5 mm and 25.5 mm.

Ultrasonic welding was carried out using a Telsonic Ultrasonic Generator series SG-22 2000 (20 kHz frequency) comprising the following components:

Telsonic ultrasonic welder press, with an MPS4 controller
Convertor SE 50/40-4-20 KHz idle peak to peak amplitude of 20 microns at 100% generator amplitude set point
Booster attached to the convertor boosting amplitude by 1:2.2
Titanium alloy 6A1-4V Sonotrode, 270 mm long×30 mm wide connected to the booster with design such to boost amplitude by: 1:2
The welding parameters held constant were:
Generator frequency—20 KHz
Generator amplitude set point—100%
Convertor amplitude—20 microns peak to peak
Booster—increasing amplitude by 1:2.2
Sonotrode—boosting amplitude to 1:2
Processing amplitude—88 microns peak to peak
Gap: The gap between the sonotrode and the anvil, it is set to the thickness of a single section of material whilst the sonotrode is not under ultrasonic motion
Holding time under pressure (after ultrasonic welding process is complete and Sonotrode vertical motion stopped)—5 seconds
The following parameters were varied, as shown in Tables 1 and 2:
Pressure (the downward pressure applied on the sonotrode during the welding process), Ultrasonic welding time, Material overlap length and Material width.
The results are shown in Tables 1 and 2. The thickness of the joined sections was measured either on a cross section of the joint or on the side of the joint (after being brought down to its original width) with an optical microscope (a Keyence microscope, at magnifications of 5 to 175 times) or a Mitutoyo QuantuMike micrometer.

During the joining of the two strips of prepreg, there was fibre spreading, i.e. a proportion of the fibre and resin was displaced, resulting in a wider portion at the joint. This increase in width was cut out manually with a knife to bring back the width to its original width (i.e. 6.5 mm, 1.5 mm or 25.5 mm).

TABLE 1

| | Sample number | | | | | | | |
|---|---|---|---|---|---|---|---|---|
| | 1 | 2 | 3 | 4 | 5 | 6 | 7 | 8 |
| Initial width (mm) | 6.5 | 6.5 | 6.5 | 6.5 | 6.5 | 6.5 | 6.5 | 6.5 |
| Overlap join (mm) | 5 | 10 | 5 | 10 | 5 | 10 | 5 | 10 |
| Pressure applied (bar) | 1 | 1 | 2 | 2 | 1 | 1 | 2 | 2 |
| Welding time (s) | 1 | 1 | 1 | 1 | 2 | 2 | 2 | 2 |
| Initial thickness strip 1 (μm) | 304 | 314 | 310 | 325 | 307 | 316 | 292 | 305 |
| Initial thickness strip 2 (μm) | 313 | 326 | 305 | 307 | 318 | 290 | 302 | 325 |
| Average thickness of sections to be joined (μm) | 309 | 320 | 308 | 316 | 312 | 303 | 297 | 315 |
| Average thickness at join after ultrasonic welding (μm) | 301 | 323 | 223 | 282 | 288 | 302 | 157 | 156 |
| Thickness of join as percentage of average thickness of sections to be joined (%) | 97.4 | 100.9 | 72.4 | 89.2 | 92.3 | 99.7 | 52.9 | 49.5 |

TABLE 2

| | Sample number | | | | | | | |
|---|---|---|---|---|---|---|---|---|
| | 9 | 10 | 11 | 12 | 13 | 14 | 15 | 16 |
| Initial width (mm) | 12.5 | 12.5 | 12.5 | 12.5 | 25.5 | 25.5 | 25.5 | 25.5 |
| Overlap join (mm) | 5 | 10 | 5 | 10 | 5 | 10 | 5 | 10 |
| Pressure applied (bar) | 1 | 1 | 1 | 1 | 1 | 1 | 2 | 2 |
| Welding time (s) | 1 | 1 | 2 | 2 | 1 | 2 | 1 | 2 |
| Initial thickness strip 1 (μm) | 338 | 315 | 308 | 274 | 301 | 378 | 284 | 325 |
| Initial thickness strip 2 (μm) | 330 | 314 | 336 | 260 | 289 | 295 | 303 | 289 |
| Average thickness of sections to be joined (μm) | 334 | 315 | 322 | 267 | 295 | 337 | 294 | 307 |
| Average thickness at join after ultrasonic welding (μm) | 328 | 307 | 283 | 301 | 371 | 350 | 324 | 285 |
| Thickness of join as percentage of average thickness of sections to be joined (%) | 98.2 | 97.5 | 87.9 | 112.7 | 125.8 | 103.8 | 110.2 | 92.8 |

The results in Tables 1 and 2 show that in almost every case join thicknesses of within plus or minus 50% of the average thickness of the non-joined sections were achieved, and that in many cases join thicknesses of plus or minus 20%, or even as low as plus or minus 5% were achieved. In comparison, joining the same materials by conventional methods, such as by use of a mechanical clamping device operated at 65° C. for up to 2 minutes would be expected to produce join thicknesses of approximately 200% of the average thickness of the non-joined regions.

Example 2

Sections of the prepreg materials used in Example 1 but cut to widths of 6.35, 12.7 and 25.4 mm were joined using the same equipment as set out in Example 1. The fixed welding parameters were the same as those used in Example 1, and the joint overlap, pressure applied and welding time were varied as shown in Table 3. The tensile strength of the joined materials was tested using an Instron Test machine with a 400N load cell. Samples were maintained with mechanical wedge grips, and tested at a speed of 2 mm/min, at room temperature. The joints were broken at ambient temperature (approximately 22° C.). The results are shown in Table 3.

TABLE 3

| Initial width (mm) | 6.35 | 6.35 | 6.35 | 12.7 | 12.7 | 12.7 | 25.4 | 25.4 |
|---|---|---|---|---|---|---|---|---|
| Overlap join (mm) | 5 | 10 | 5 | 5 | 10 | 5 | 5 | 10 |
| Pressure applied (bar) | 1 | 1 | 2 | 1 | 1 | 2 | 1 | 1 |
| Welding time (s) | 1 | 1 | 2 | 1 | 1 | 2 | 1 | 1 |
| Average thickness at join after ultrasonic welding (μm) | 190 | 240 | 140 | 270 | 280 | 170 | 310 | 380 |
| Tensile strength (N) | 19 | 84 | 54 | 79 | 147 | 54 | 206 | 346 |

The results in Table 3 show that the joins produced by the process according to the present invention were effectively permanent joins, in that they were all sufficiently strong to withstand normal handling of the joined prepregs.

Example 3

Sections of the prepreg material used in Example 1 but cut to a width of 12.7 mm were joined using the same equipment as set out in Example 1. The fixed welding parameters were the same as used in Example 1, and the joint overlap was 10 mm, the pressure applied was 1 bar and the welding time was 1 second. The resin chemistry at the joined regions was investigated by DSC performed on a Mettler Toledo DSC (with run parameters of −50° C. to 350° C., at a temperature increase rate of 10° C./min), to check for localised cure or aging, and the sub-ambient Tg was also measured. Two joints were tested in duplicate and compared to an adjacent area of non-welded material (Standard 1). The results are shown in Table 4.

TABLE 4

| Sample | Tg ° C. | ΔH J/g |
|---|---|---|
| Join 1 run 1 | 1.7 | 133 |
| Join 1 run 2 | −0.3 | 143 |
| Mean: Join 1 | 0.7 | 138 |
| Join 2 run 1 | −0.7 | 181 |
| Join 2 run 2 | 0.6 | 179 |
| Mean: Join 2 | 0.0 | 180 |
| Standard 1 run 1 | 2.5 | 212 |
| Standard 1 run 2 | 1.6 | 197 |
| Mean: Standard 1 | 2.1 | 205 |

The results in Table 4 show that joining the materials by the method of the present invention did not significantly change the sub-ambient Tg or case localised cure or aging.

Example 4

Further joins were made in using prepregs corresponding to the materials used in Example 1, but all having a width of 12.7 mm. The joins were formed using the apparatus and set parameters described in Example 1. Overlap was fixed at 10 mm, welding time was fixed at 0.5 seconds, and a pressure of 1 bar was used (one sample "S2" was joined at 0.75 bars to show the effect of pressure).

Thickness of the join was measured with a micrometre, and tensile strength was measured with an Instron machine with a 400N load cell, using the methods described in previous the Examples.

Three different join shapes were tested, namely Straight (S), Saw-tooth (P) and Straight-saw-tooth (SP), as shown in FIG. 1.

The results are shown in Tables 5 and 6.

TABLE 5

| | Sample | | | | | | |
|---|---|---|---|---|---|---|---|
| | 1 | 2 | 3 | 4 | 5 | 6 | 7 |
| Joint Pattern code | S | S | S | S | S | P | P |
| Initial width (mm) | 12.7 | 12.7 | 12.7 | 12.7 | 12.7 | 12.7 | 12.7 |
| Overlap join (mm) | 10 | 10 | 10 | 10 | 10 | 10 | 10 |
| Pressure applied (bar) | 1 | 1 | 1 | 1 | 1 | 1 | 1 |
| Welding time (s) | 0.5 | 0.5 | 0.5 | 0.5 | 0.5 | 0.5 | 0.5 |
| Initial thickness strip 1 (μm) | 295 | 290 | 290 | 295 | 290 | 290 | 290 |
| Initial thickness strip 2 (μm) | 290 | 290 | 295 | 295 | 290 | 285 | 290 |
| Average thickness of sections to be joined (μm) | 292.5 | 290 | 292.5 | 295 | 290 | 287.5 | 290 |
| Average thickness at join after ultrasonic welding (μm) | 290 | 285 | 288 | 284 | 290 | 285 | 285 |
| Thickness of join as percentage of average thickness of sections to be joined (%) | 99.19 | 98.3 | 98.5 | 96.3 | 100 | 99.1 | 98.3 |
| Tensile strength (N) | 110 | | 10 | 115 | 97 | 77 | 100 |

TABLE 6

| | Sample | | | | | | |
|---|---|---|---|---|---|---|---|
| | 8 | 9 | 10 | 11 | 12 | 13 | 14 |
| Joint Pattern code | P | SP | SP | SP | S | S | S |
| Initial width (mm) | 12.7 | 12.7 | 12.7 | 12.7 | 12.7 | 12.7 | 12.7 |
| Overlap join (mm) | 10 | 10 | 10 | 10 | 10 | 10 | 10 |
| Pressure applied (bar) | 1 | 1 | 1 | 1 | 0.75 | 0.75 | 0.75 |
| Welding time (s) | 0.5 | 0.5 | 0.5 | 0.5 | 0.5 | 0.5 | 0.5 |
| Initial thickness strip 1 (μm) | 285 | 285 | 290 | 295 | 280 | 285 | 290 |
| Initial thickness strip 2 (μm) | 285 | 290 | 290 | 290 | 280 | 290 | 290 |
| Average thickness of sections to be joined (μm) | 285 | 287.5 | 290 | 292.5 | 280 | 287.5 | 290 |
| Average thickness at join after ultrasonic welding (μm) | 285 | 285 | 285 | 285 | 310 | 315 | 315 |
| Thickness of join as percentage of average thickness of sections to be joined (%) | 100 | 99.1 | 98.3 | 97.4 | 110.7 | 109.6 | 108.6 |
| Tensile strength (N) | | 115 | 104 | | 110 | | 117 |

The results in Tables 5 and 6 show that in almost every case join thicknesses of within plus or minus 10% of the average thickness of the non-joined sections were achieved, and that in most cases join thicknesses of plus or minus 5% were achieved. The results in Tables 5 and 6 also show that in most cases the joins produced by the process according to the present invention were effectively permanent joins, in that they were all sufficiently strong to withstand normal handling of the joined prepregs.

Example 5

In this example, sections of a prepreg of width 250 mm were joined. The prepreg material was the same as the prepreg material used in Example 1.

To allow for fibre and resin spreading a pattern was cut at the end of both sections to be joined. The pattern used was a castellated pattern, with approximately 33% of the material overlapping taken off, as shown in FIG. 2. The legs produced by the cutting were 10 mm long with a width of 4 mm, and the gap between each leg was 2 mm. The material was cut using the Zund automatic cutter.

The 4 mm wide legs were overlapped one above the other with another piece of prepreg that had the exact same pattern, with the 2 mm gaps left as spaces for the prepreg to spread into and the overlaid sections were ultrasonically welded to make a permanent join using the ultrasonic weld press described in Example 1.

The overlap was 10 mm, the pressure used was 2 bars, and the welding time of 1 second.

The average thickness, measured on a cross section of the joint with a Keyence microscope (mag 5-175 times) was 420 microns.

Measures on the single ply non treated area gave an average of 300 microns.

The increase thickness at the joint was approximately 40%.

Samples were then cut out throughout the width of the master tape, to test the tensile strength of samples similar to slit tape products.

The average tensile strength for 6 mm wide strips was 30N, i.e. an effectively permanent join was formed.

Example 6

Samples of the prepreg material described in Example 1 were cut to widths of 12.7 mm and joined using the equipment described in Example 1. The fixed welding parameters were the same as those described in Example 1 and the joint overlap, pressure applied and welding time were varied, as shown in Table 7. Joint thickness, joint strength and sub-ambient Tg in the joint regions were measured using the methods described in the previous Examples, and the results were compared to the results for adjacent non-welded regions of material (Ref 1). The results are shown in table 7.

TABLE 7

| | Sample number | | | |
|---|---|---|---|---|
| | Ref 1 | 1 | 2 | 15 |
| Initial width (mm) | 12.7 | 12.7 | 12.7 | 12.7 |
| Overlap join (mm) | / | 10 | 10 | 25 |
| Pressure applied (bar) | / | 1 | 1 | 1 |
| Welding time (s) | / | 0.5 | 0.5 | 2 |
| Initial thickness strip 1 (μm) | / | 282 | 288 | 285 |
| Initial thickness strip 2 (μm) | / | 281 | 280 | 280 |
| Average thickness of sections to be joined (μm) | / | 281.5 | 284 | 282.5 |
| Average thickness of join after ultrasonic welding (μm) | / | 290 | 290 | 300 |
| Thickness at join as percentage of average thickness of sections to be joined (%) | / | 103.0 | 102.1 | 106.2 |
| Tensile strength (N) | / | 101 | 102 | 315 |
| Tg (° C.) | −4.13 | −3.01 | −3.83 | / |

The results in Table 7 show that the processes of the present invention can provide very strong joins having thicknesses very close to the thickness of the individual unjoined materials, i.e. joint areas varying only slightly in thickness from unjoined areas (i.e. from 2.1% to 6.2% thicker), without significantly altering the chemistry of the material in the area of the join (sub-ambient Tg changed by from 0.3° C. to 1.12° C. only).

Example 7

Samples of a prepreg material comprising the same components as the material described in Example 1 but having a reduced fibre areal weight of 194 g/m² were cut to widths of 6.35 mm and joined using the equipment described in Example 1. The fixed welding parameters were the same as those described in Example 1 and the joint overlap, pressure applied and welding time were varied, as shown in Table 8. Joint thickness, joint strength and sub-ambient Tg in the joint regions were measured using the methods described in the previous Examples, and the results were compared to the results for adjacent non-welded regions of material (Ref 2). The results are shown in table 8.

TABLE 8

| | Sample number | | | | |
| --- | --- | --- | --- | --- | --- |
| | Ref 2 | 1 | 2 | 3 | 4 |
| Initial width (mm) | 6.35 | 6.35 | 6.35 | 6.35 | 6.35 |
| Overlap join (mm) | / | 5 | 10 | 15 | 25 |
| Pressure applied (bar) | / | 0.75 | 0.75 | 0.75 | 0.75 |
| Welding time (s) | / | 0.1 | 0.15 | 0.2 | 0.4 |
| Initial thickness strip 1 (μm) | / | 221 | 225 | 226 | 222 |
| Initial thickness strip 2 (μm) | / | 220 | 224 | 222 | 224 |
| Average thickness of sections to be joined (μm) | / | 220.5 | 224.5 | 224 | 223 |
| Average thickness at join after ultrasonic welding (μm) | / | 195 | 219 | 215 | 215 |
| Thickness at join as percentage of average thickness of sections to be joined (%) | / | 88.4 | 97.6 | 96.0 | 96.4 |
| Tensile strength (N) | / | 46 | 97 | 136 | 260 |
| Tg (° C.) | −1.55 | 0.22 | −0.11 | −0.25 | −0.14 |

The results in Table 8 show that the processes of the present invention can provide very strong joins having thicknesses very close to the thickness of the individual unjoined materials, i.e. joint areas varying only slightly in thickness from unjoined areas (i.e. 88.4% to 97.6% of the unjoined thickness), without significantly altering the chemistry of the material in the area of the join (changing by from 1.3° C. to 1.77° C. only).

Example 8

Samples of prepreg material comprising the same components as the materials described in Example 1 but having a reduced fibre areal weight of 194 g/m² were prepared having a width of 150 mm. In some cases the ends of the materials were straight (S) and in some cases the ends were formed into saw-tooth patterns comprising triangles having a base width of 6 mm and a height of 20 mm. Sections of each of the materials were overlaid on correspondingly shaped sections of material with various overlap lengths. For the saw-tooth shaped materials two different configurations were used, either point to valley (PtoV) as shown in FIG. 3, or point to point (PtoP) as shown in FIG. 4. Joining was carried out as described in Example 1 using the same fixed parameters but with the following variable parameters, Pressure: 2 bar, ultrasonic welding time: 2 seconds, material overlap length as shown in Table 9, material width: 150 mm, joint pattern as shown in Table 9. In addition, multiple welding cycles (two or three, as shown in Table 9) were carried out moving the material to be joined with respect to the sonotrode between each cycle to ensure that all of the area of overlap plus 5 to 10 mm either side of the overlaid region was subjected to welding.

Following welding the thickness of the joined regions was measured using a micrometer, and the joined materials were slit into 6.35 mm wide tapes.

The strength of the joints were measured in the slit materials using a Texture Analyzer, Model: TA XTplus (available from Stable Micro systems) having a 400N load cell (capable of measuring loads of up to 350N). The load testing was carried out at 2 mm/min at approximately 8° C. The results are shown in Table 9.

TABLE 9

| | Sample number | | | | |
| --- | --- | --- | --- | --- | --- |
| | 1 | 2 | 3 | 4 | 5 |
| Initial width (mm) | 150 | 150 | 150 | 150 | 150 |
| Joint Pattern | PtoV | PtoV | S | PtoP | PtoV |
| Overlap join (mm) | 50 | 50 | 10 | 40 | 30 |
| Pressure applied (bar) | 2 | 2 | 2 | 2 | 2 |
| Welding time (s) | 2 | 2 | 2 | 2 | 2 |
| Welding cycles | 2 | 3 | 2 | 3 | 2 |
| Initial thickness strip 1 (μm) | 222 | 223 | 222 | 224 | 222 |
| Initial thickness strip 2 (μm) | 224 | 223 | 221 | 222 | 222 |
| Average thickness of sections to be joined (μm) | 223 | 223 | 221.5 | 223 | 222 |
| Average thickness at join after ultrasonic welding (μm) | 343 | 322 | 325 | 254 | 254 |
| Thickness of join as % of average thickness of sections to be joined (%) | 154 | 144 | 147 | 114 | 114 |
| Tensile strength test 1 (N) | >350 | >350 | >350 | 200 | >350 |
| Tensile strength test 2 (N) | >350 | >350 | >350 | >350 | >350 |
| Tensile strength test 3 (N) | >350 | >350 | 310 | >350 | >350 |

The results in Table 9 show that wide sections of material may be joined by the processes of the present invention, and that even with long regions of overlap the thickness of the joins is in most cases within plus or minus 50% of the average thickness of the non-joined sections, and with thickness of less than plus or minus 20% of the average thickness possible in some cases by shaping the ends of the sections to be joined. The joined materials may be slit to form narrow tapes and the strengths of the joins in the narrow tapes can still exceed 300N, or even 350N.

The invention claimed is:
1. A process for forming a permanent joint between two sections of fibrous material contained in a thermosetting resin matrix, said process comprising overlaying the two sections and subjecting the overlaid sections to ultrasonic welding to form a permanent joint between the two sections, wherein there is no significant change in the sub-ambient Tg of the fibrous material contained in the thermosetting resin matrix in the region of the permanent joint;
   wherein the thickness of the permanent joint is from 50% to 150% of the average thickness of each of the two overlaid sections before they are overlaid;

wherein the length of the overlaid section is from 3 mm to 200 mm;

wherein the ultrasonic welding is carried out by contacting the area to be ultrasonically welded with a sonotrode while it is supported by an anvil;

wherein at least one of the sections of fibrous material contained in a thermosetting resin matrix is shaped to remove a portion of the material in the area to be joined before the sections are overlaid, preferably wherein both sections of fibrous material contained in a thermosetting resin matrix are shaped to remove a portion of the material in the area to be joined before the sections are overlaid; and, wherein both sections to be joined are shaped in complimentary castellated or saw-tooth patterns.

2. The process according to claim 1, wherein the sonotrode operates at a frequency of from 15 to 70 kHz.

3. The process according to claim 2, wherein the sonotrode operates with an amplitude of from 5 to 150 μm.

4. The process according to claim 3, wherein the sonotrode operates with a pressure of from 0.01 to 0.6 MPa (0.1 to 6 bar).

5. The process according to claim 4, wherein the sonotrode operates for a welding period of from 0.01 to 30 seconds.

6. The process according to claim 5, wherein the sonotrode is operated with a hold time of from 0.1 to 10 seconds following completion of the weld time.

7. The process according to claim 6, wherein the sonotrode and anvil are arranged so that when the sonotrode is at its closest point to the anvil, the gap between the sonotrode and the anvil is from zero to 150% of the average thickness of each of the two overlaid sections before they are joined.

8. The process according to claim 7, wherein both sections of fibrous material contained in a thermosetting resin matrix are shaped, and the amount of material removed from each shaped section is from 25 to 75%.

* * * * *